(12) United States Patent
Rothschild

(10) Patent No.: US 11,754,106 B2
(45) Date of Patent: Sep. 12, 2023

(54) ATTACHMENT ASSEMBLY AND METHOD

(71) Applicant: Penn United Technologies, Inc., Cabot, PA (US)

(72) Inventor: Jesse Benedict Rothschild, Pittsburgh, PA (US)

(73) Assignee: Penn United Technologies, Inc.

( * ) Notice: Subject to any disclaimer, the term of this patent is extended or adjusted under 35 U.S.C. 154(b) by 212 days.

(21) Appl. No.: 17/304,175

(22) Filed: Jun. 16, 2021

(65) Prior Publication Data

US 2021/0396256 A1 Dec. 23, 2021

Related U.S. Application Data

(60) Provisional application No. 63/041,144, filed on Jun. 19, 2020.

(51) Int. Cl.
*F16B 7/04* (2006.01)
*F16B 21/18* (2006.01)

(52) U.S. Cl.
CPC ............ F16B 7/042 (2013.01); F16B 21/18 (2013.01)

(58) Field of Classification Search
CPC ...... F16B 21/18; F16B 21/086; F16B 21/186; F16B 7/042; F16L 37/0842; H01R 13/62; H01R 13/6271; H01R 13/187; H01R 13/04
See application file for complete search history.

(56) References Cited

U.S. PATENT DOCUMENTS

| 2,248,269 | A | * | 7/1941 | Bilde | A47L 9/242 |
| | | | | | 285/305 |
| 2,939,729 | A | * | 6/1960 | O'Shaughnessy, Jr. | |
| | | | | | F16L 37/0842 |
| | | | | | 285/112 |
| 4,805,943 | A | * | 2/1989 | Balsells | F16B 21/18 |
| | | | | | 267/167 |
| 5,733,084 | A | * | 3/1998 | Fullerton | F16B 37/0857 |
| | | | | | 411/270 |
| 6,095,569 | A | | 8/2000 | Hester | |
| 8,366,356 | B2 | * | 2/2013 | Novak | B23B 51/0473 |
| | | | | | 408/239 R |
| 8,646,339 | B2 | * | 2/2014 | Smith | F16B 31/028 |
| | | | | | 411/433 |
| 2005/0164551 | A1 | * | 7/2005 | Wlos | H01R 24/40 |
| | | | | | 439/578 |
| 2006/0083582 | A1 | * | 4/2006 | Balsells | F16B 21/18 |
| | | | | | 403/325 |
| 2007/0272805 | A1 | * | 11/2007 | Kim | E04G 21/185 |
| | | | | | 248/56 |
| 2020/0056646 | A1 | | 2/2020 | DuBois et al. | |

OTHER PUBLICATIONS

U.S. Patent and Trademark Office, PCT/US21/37555 International Search Report and Written Opinion, Sep. 15, 2021, 13 pages.

* cited by examiner

*Primary Examiner* — Daniel J Wiley
(74) *Attorney, Agent, or Firm* — Penn United Technologies, Inc.

(57) ABSTRACT

An attachment assembly includes a first component, a second component, and a locking device assembly. The locking device assembly is structured to move between an unlocked position corresponding to the second component being attachable to, and removable from, the first component and a locked position corresponding to the second component being securely coupled to the first component.

13 Claims, 7 Drawing Sheets

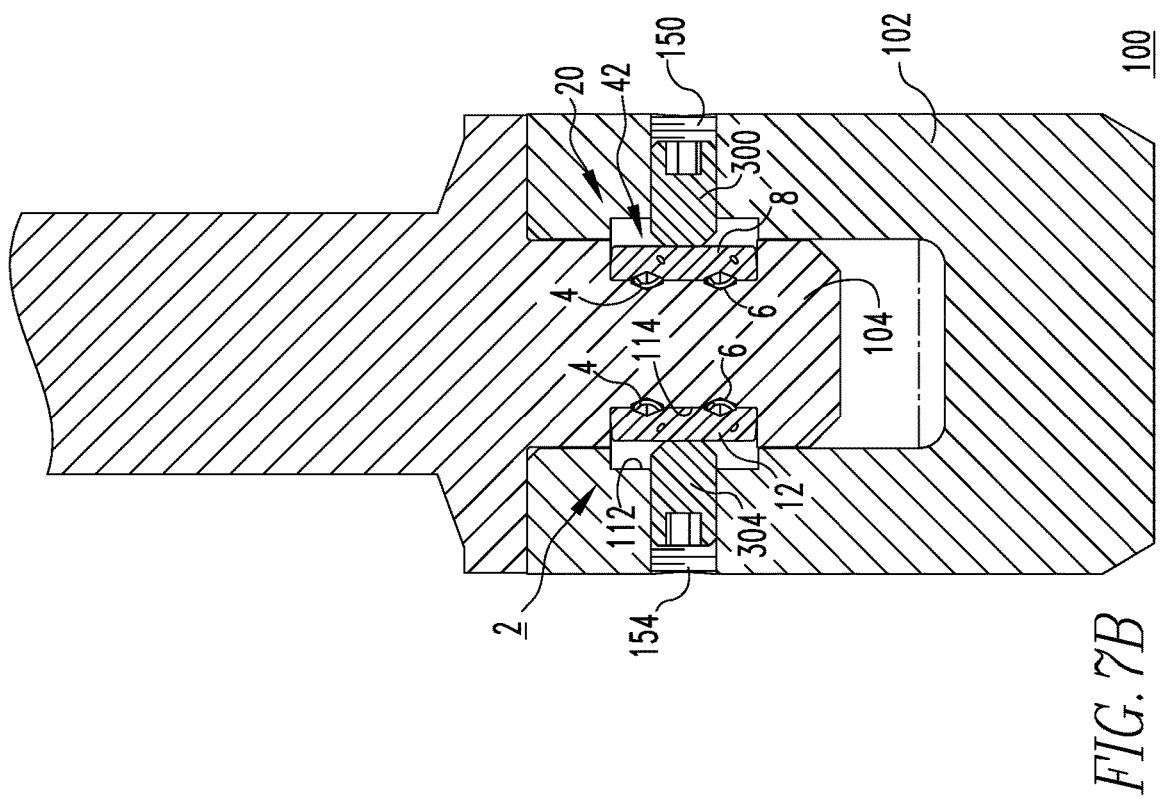
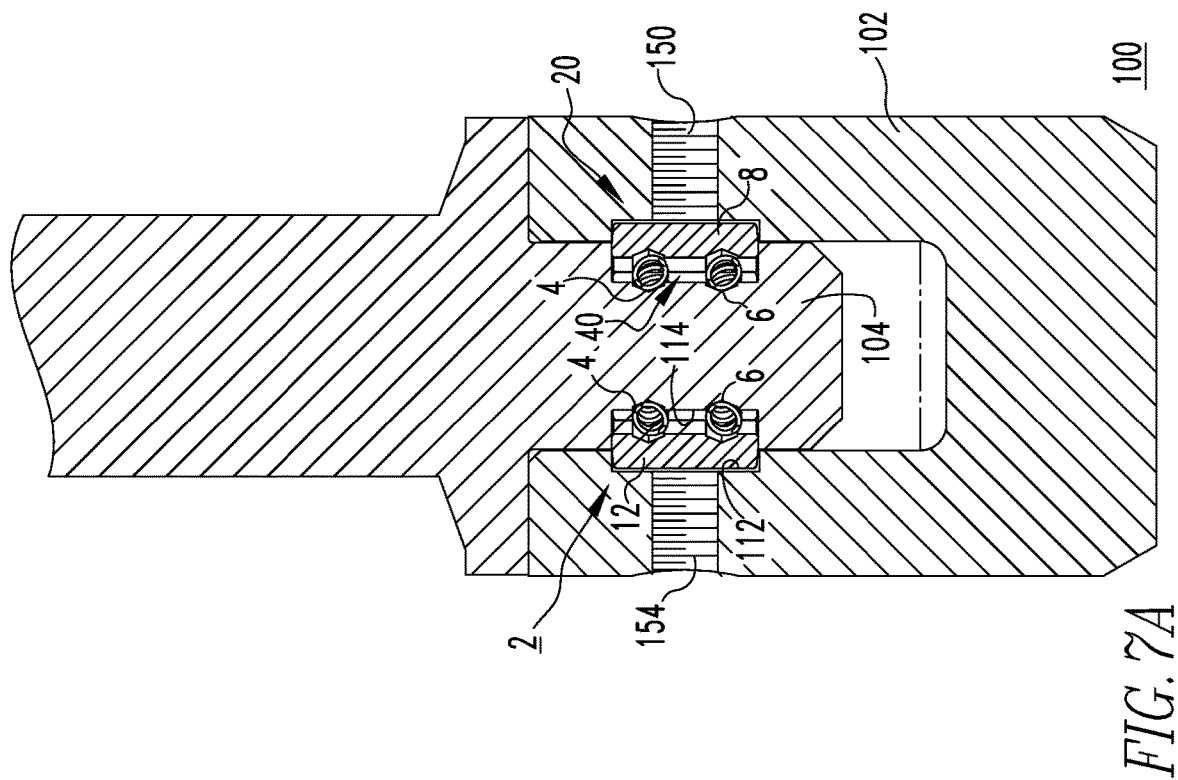
FIG. 7A
FIG. 7B

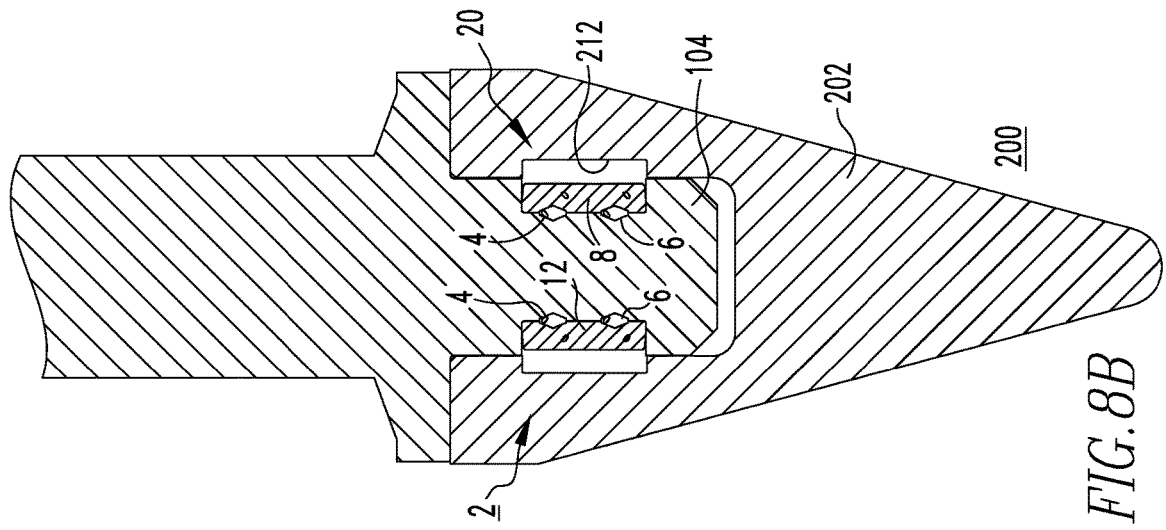
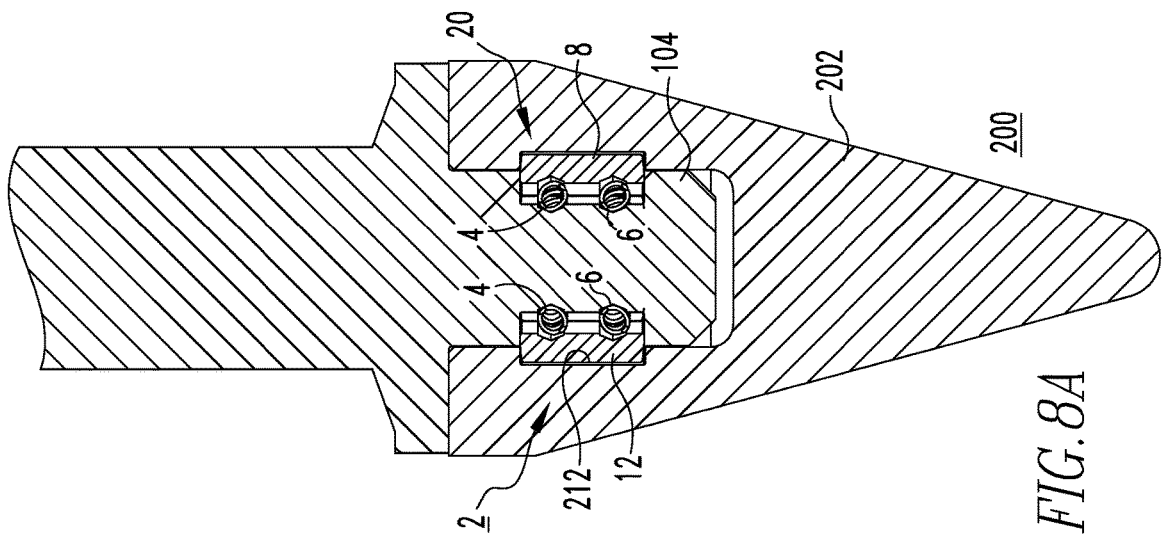

ATTACHMENT ASSEMBLY AND METHOD

CROSS-REFERENCE TO RELATED APPLICATIONS

This application is a divisional application of, and claims priority to, U.S. Provisional Patent Application No. 63/041,144, filed Jun. 19, 2020, entitled, Attachment Assembly and Method.

FIELD OF THE INVENTION

The disclosed concept relates generally to attachment assemblies, and more particularly, to attachment assemblies and associated methods for mechanically attaching a first component made of a first material to a second component made of a second, different material in a manner that prevents unintended separation yet can also accommodate different coefficients of thermal expansion between the first and second component materials.

BACKGROUND OF THE INVENTION

The disclosed concept relates generally to attachment assemblies, and more particularly, to attachment assemblies and associated methods for mechanically attaching a first component made of a first material to a second component made of a second, different material in a manner that prevents unintended separation yet can also accommodate different coefficients of thermal expansion between the first and second component materials.

The attachment of components made from two different materials will involve a differing (e.g., without limitation, non-linear) change of dimensions of the two components over a range of temperatures due to differential coefficients of thermal expansion between the different materials. This presents design limitations, limits to operational parameters, and risks for failure of the assembly or individual parts of the assembly.

Current methods for attaching carbide, ceramic, cermet, hard metals, or other wear-resistant parts to metal shafts, stems, bars, plates, or other components include, for example bolting, shrink-fitting (e.g., interference fit assemblies), epoxy or glue, draw-bolts or threaded collar/follower, and ball-bearing locking or garter spring latching, which utilizes balls captured by, or a garter spring captured by, adjacent grooves in the two components locking the components together. These methods generally are deployed with consideration of the relative brittleness of carbide, ceramic, cermet, hard materials, or other wear-resistant parts, and the typically substantial difference in coefficients of thermal expansion of these materials and the components to which they are coupled.

For purposes of more fully describing specific issues and aspects, and to provide further description and clarification, a particular material (e.g., without limitation, carbide) may be mentioned herein. It will be appreciated, however, that such material (e.g., without limitation, carbide) is mentioned solely for purposes of illustration and is merely one non-limiting example material. That is, it will be appreciated that the issues addressed and discussed herein may apply to any known or suitable alternative type(s) and/or combination(s) of material(s), without departing from the scope of the disclosed concept.

Shrink-fit (e.g., interference fit) attachment assemblies require the metallic component to be the outer component gripping around the inner carbide component and putting the carbide under compression. This is because the opposite arrangement (i.e., the carbide component being the outer component) would result in tension on the carbide, which would cause the carbide to fracture when the metallic component expands. Accordingly, shrink-fit attachment assemblies have limited ranges of temperature in service/storage due to the differential between the coefficients of thermal expansion of the carbide and the metallic alloy to which the carbide is attached. Exceeding the temperature limits can either eliminate the interference grip on the carbide component, or over-compress causing fracture of the carbide or yielding of the metallic component. Additional disadvantages of shrink-fit attachment assemblies include the fact that they create a relatively bulky joint, which is often too large for the available space in a parent assembly, such as for example and without limitation, a valve. Additionally, very small diameter metallic components will not expand sufficiently when heated to allow for the assembly to the carbide part.

Epoxy attachment assemblies are prone to glue joint failures during temperature changes due to different coefficients of thermal expansion between the carbide and the metallic alloy to which the carbide is attached. Epoxy is also subject to temperature limitations. For example, typically, epoxies cannot be used in excess of 450° F. Additional disadvantages of epoxy attachment assemblies include the fact that the glue joint often cannot handle the pressure requirements of service, epoxies have low compressive strength, and the processes for ensuring bonding, including surface preparation and surface cleanliness, are difficult, making it difficult to achieve a repeatable, reliable bonding process.

Threaded carbide attachment assemblies also suffer from difficulties. For example, they are prone to carbide fractures during temperature changes due to different coefficients of thermal expansion between the carbide and the metallic alloy to which the carbide is attached. Additionally, they cannot handle significant torque loads on the threads due to the brittleness of the carbide threads. It is also expensive to grind threads into carbide, and preformed (as-sintered) threads are imperfect and further weaken the threaded joint since each thread loads differently against the corresponding threads of the metallic part.

Draw-bolt or threaded collar/follower attachment assemblies, which capture the carbide between two threaded metal stem parts, also have disadvantages. For example, they are expensive and require a significant amount of space (e.g., footprint) inside the associated parent assembly, such as for example and without limitation, a valve. Further, they rely on soft seals to prevent leaks/erosion between carbide and metal components.

Ball lock attachment assemblies and garter spring latched attachment assemblies comprise a radius-bottom groove machined/ground in each component of the assembly, wherein when the grooves of the two components are aligned, metal, carbide, ceramic, or cermet balls are, or a garter spring is, fed into the mated grooves, via a hole intersecting with the aligned grooves, and the balls lock, or the garter spring locks, the two components together. These assemblies are also very expensive, and consume too much space/footprint inside the associated parent assembly, such as for example and without limitation, a valve. They also rely on soft seals to prevent leaks/erosion between carbide and metal components. Further, the clearance fit required for assembly is exacerbated at elevated temperatures, causing movement between the components, which can be a source of failure.

Brazing attachment assemblies are prone to carbide fractures during temperature changes due to differential coefficients of thermal expansion between the carbide and the metallic alloy to which the carbide is attached, especially considering the relative brittleness of carbide materials. They also involve difficult processes for ensuring bonding, including surface preparation, surface cleanliness, and adequate wetting of the braze alloy to the surface. Consequently, it is difficult to guarantee a repeatable, reliable process. Moreover, the expense associated with assuring a complete and reliable bond can be cost-prohibitive.

It will be appreciated, therefore, that there is room for improvement in attachment assemblies and methods.

SUMMARY OF THE INVENTION

These needs and others are met by embodiments of the disclosed concept, which are directed to an attachment assembly and method, which among other benefits employs elements that can extend apart (e.g., expand) or collapse closer together (e.g., compress) to accommodate differing (e.g., without limitation, non-linear) dimensional changes between the two components being mated, even if the components have different coefficients of thermal expansion, yet the locking elements remain engaged with both components, locking the components together in linear or axial directions.

As one aspect of the disclosed concept, an attachment assembly comprises: a first component; a second component; and a locking device assembly structured to move between an unlocked position corresponding to the second component being attachable to, and removable from, the first component and a locked position corresponding to the second component being securely coupled to the first component.

The locking device assembly may include at least one biasing element and a number of locking elements, wherein the at least one biasing element is structured to move between an expanded position and a compressed position, and then return to the expanded position, thereby moving the number of locking elements.

The at least one biasing element may be a circular biasing element, and the number of locking elements may be a plurality of arcuate segments disposed about a perimeter of the circular biasing element to form an expandable ring. In the expanded position, the circular biasing element may bias the plurality of arcuate segments radially outward, and in the compressed position the circular biasing element may compress thereby moving the plurality of arcuate segments radially inward.

The first component may be a plug, and the second component may be a shaft, wherein the shaft extends through the expandable ring such that the locking device assembly is disposed on the shaft. When the locking device assembly is in the compressed or unlocked position, the shaft may be inserted into and removed from, the plug, and when the locking device assembly is in the expanded or locked position, the shaft is securely coupled to the plug.

The at least one biasing element may be at one canted coil spring.

As another aspect of the disclosed concept, a method of employing an attachment assembly, comprises: providing a first component, providing a second component, providing a locking device assembly, and moving the locking device assembly from an unlocked position to a locked position in order to securely couple the second component to the first component.

BRIEF DESCRIPTION OF THE DRAWINGS

A full understanding of the disclosed concept can be gained from the following description of the preferred embodiments when read in conjunction with the accompanying drawings in which:

FIGS. 7A and 7B are section views of an attachment assembly employing the locking device key assembly of FIGS. 1-6, in accordance with an embodiment of the disclosed concept, with FIG. 7A showing the locking device key assembly in the expanded position, and FIG. 7B showing the locking device key assembly in the compressed position;

FIGS. 8A and 8B are section views of another attachment assembly employing a locking device key assembly, in accordance with another embodiment of the disclosed concept, with FIG. 8A showing the locking device key assembly in the expanded position, and FIG. 8B showing the locking device key assembly in the compressed position;

DETAILED DESCRIPTION OF THE INVENTION

Figure 1:
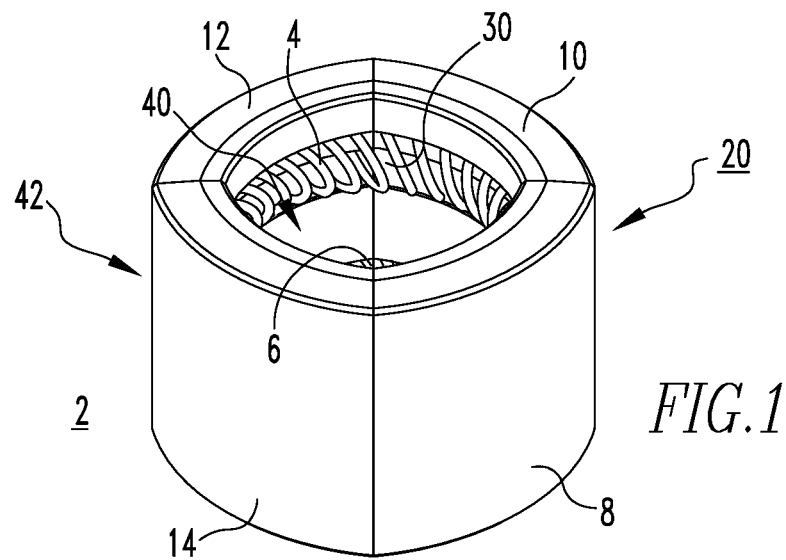
FIG. 1 is an isometric view of a locking device key assembly for an attachment assembly in accordance with an embodiment of the disclosed concept, shown in a compressed position.

For purposes of illustration, embodiments of the disclosed concept will be shown and described as applied to the attachment of carbide to metal, although it will become apparent that it could apply to attaching alternative materials, such as for example and without limitation, ceramic, cermet, hard metals, or other wear-resistant parts to shafts, stems, bars, plates, or any other known or suitable components. It will also become apparent that the disclosed concept could apply to any known or alternative type, shape, and/or configuration of attachment assembly for achieving a suitable connection of components, which may be made from any known or suitable material, and which may be employed in any known or suitable application or context (e.g., for example and without limitation, to control, modulate, or stop the flow of fluids or gases, such as valves, mud-pulsing tools, chokes, weirs, separators, etc.).

It will be appreciated that the specific elements illustrated in the figures herein and described in the following specification are simply exemplary embodiments of the disclosed concept, which are provided as non-limiting examples solely for the purpose of illustration. Therefore, specific dimensions, orientations and other physical characteristics related to the embodiments disclosed herein are not to be considered limiting on the scope of the disclosed concept.

Directional phrases used herein, such as, for example, left, right, front, back, top, bottom, upper, lower and derivatives thereof, relate to the orientation of the elements shown in the drawings and are not limiting upon the claims unless expressly recited therein.

As employed herein, the statement that two or more parts are "coupled" together shall mean that the parts are joined together either directly or joined through one or more intermediate parts.

As employed herein, the term "number" shall mean one or an integer greater than one (i.e., a plurality).

FIGS. 1-6 show a locking device assembly 2 for an attachment assembly 100 (FIGS. 7A, 7B and 9-15), 200 (FIGS. 8A and 8B) in accordance with one non-limiting embodiment of the disclosed concept. The locking device assembly 2 in the example shown is a locking device key assembly 2, which employs at least one biasing element 4, 6 (both partially shown in FIGS. 1, 4 and 6; see also FIGS. 7A-9 and FIGS. 11-15) and a number of locking elements 8, 10, 12, 14 (all shown in FIGS. 1, 2, 4 and 5). In the non-limiting example shown and described herein, each biasing element 4, 6 is a circular biasing element, and each locking element 8, 10, 12, 14 is an arcuate segment, or key, with a plurality of such arcuate segments 8, 10, 12, 14 being disposed about a perimeter of the circular biasing element(s) 4, 6 to form an expandable ring 20, as best shown in the isometric and top plan views of FIGS. 1, 2, 4 and 5.

Figure 2:
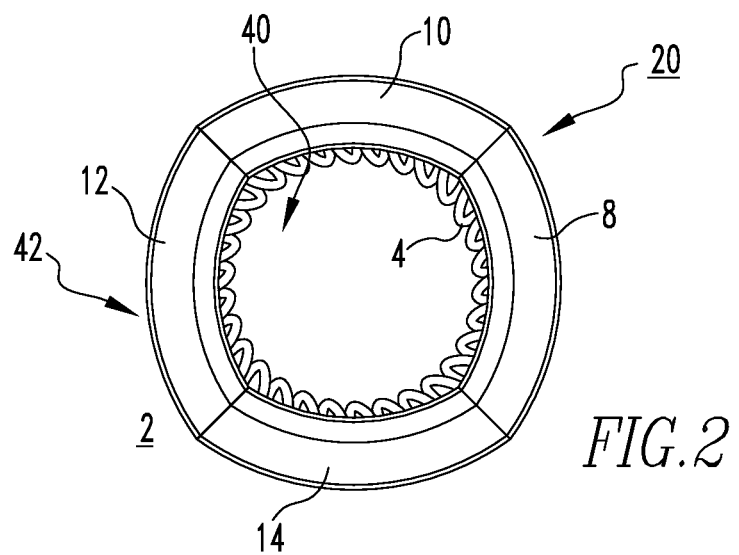
FIG. 2 is a top elevation view of the locking device key assembly of FIG. 1.
Figure 5:
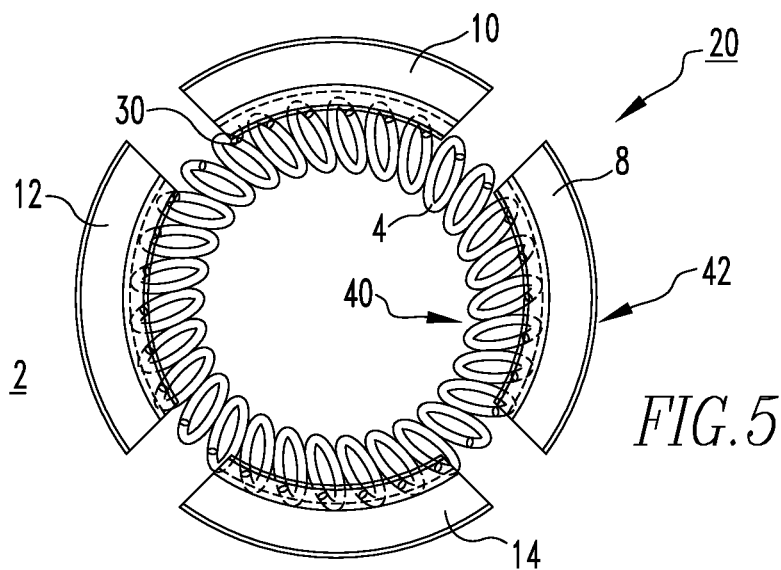
FIG. 5 is a top elevation view of the locking device key assembly of FIG. 4.

In more detail, the example locking device key assembly 2 employs four keys 8, 10, 12, 14 and two circular biasing elements 4, 6. Further, each of the arcuate segments or keys 8, 10, 12, 14 is preferably the same or equal in size and shape. That is, the exemplary expandable ring 20 is comprised of four equal arcuate segments or keys 8, 10, 12, 14, as best shown in FIGS. 2 and 5. It will be appreciated, however, that any known or suitable alternative number, type and/or configuration of keys and/or biasing elements could be employed without departing from the scope of the disclosed concept. It will also be appreciated that locking device elements other than keys (e.g., without limitation, pins (not shown)) could be alternatively employed in any known or suitable number, type and/or configuration.

Preferably, the biasing elements 4, 6 comprise canted coil springs, as shown. It will be appreciated, however, that alternative embodiments employing other suitable biasing elements (e.g., without limitation, traditional coil springs (not shown)) are contemplated.

Figure 3:
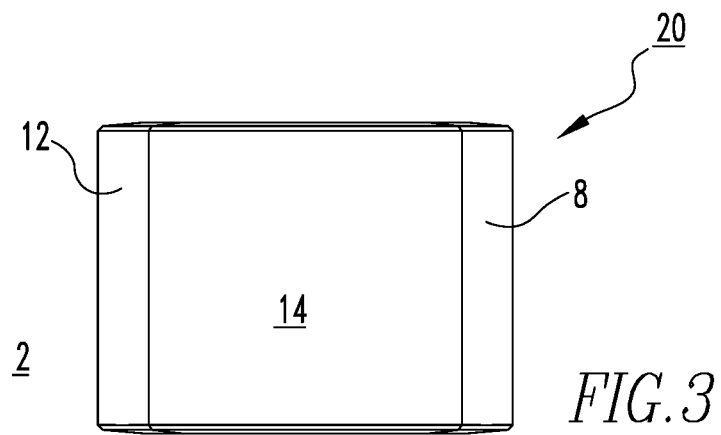
FIG. 3 is a side elevation view of the locking device key assembly of FIG. 2.
Figure 4:
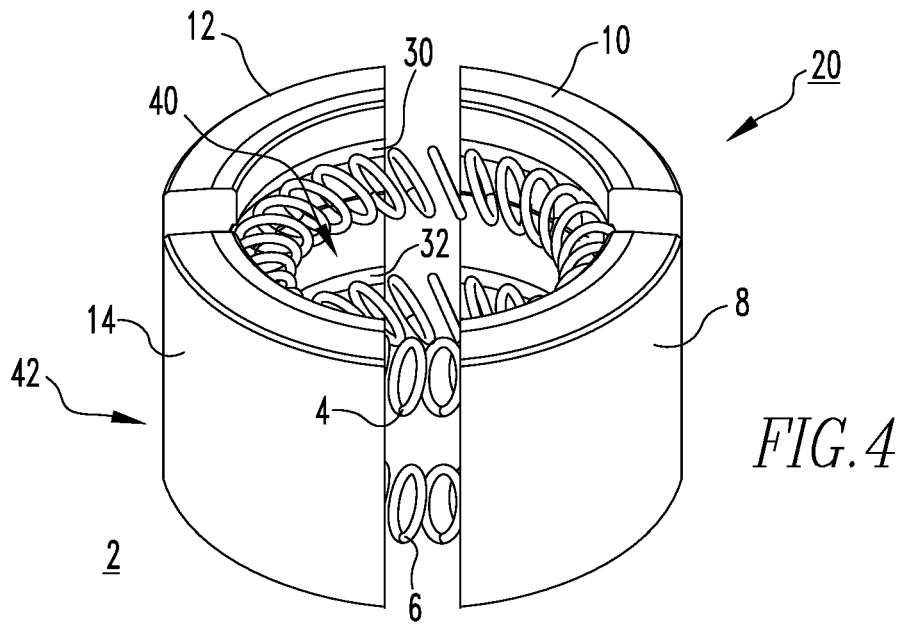
FIG. 4 is an isometric view of the locking device key assembly of FIG. 1, shown in an expanded position.
Figure 6:
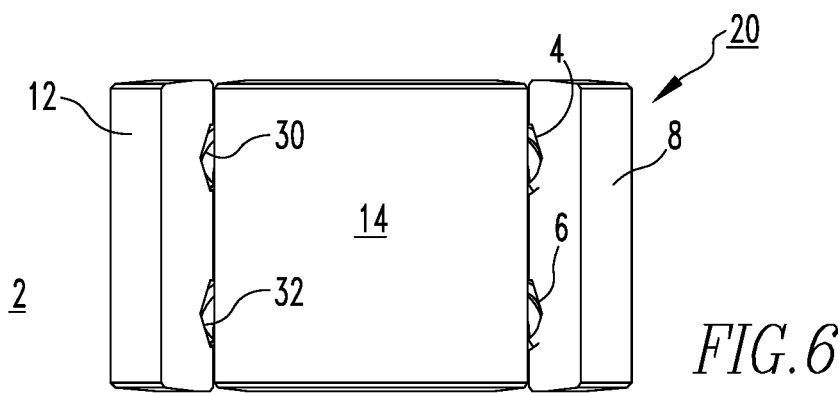
FIG. 6 is a side elevation view of the locking device key assembly of FIG. 5.

FIGS. 1-3 show the locking device key assembly 2 in the compressed position, whereas FIGS. 4-6 show the locking device key assembly 2 in an expanded position wherein the keys 8, 10, 12, 14 are displaced radially outwardly by the canted coil springs 4, 6. That is, it will be appreciated that the disclosed attachment assembly 100 (FIGS. 7A, 7B and 9-15), 200 (FIGS. 8A and 8B) and associated method employs elements (e.g., without limitation, keys 8, 10, 12, 14) that can extend apart (e.g., expand as shown in FIGS. 4-6) or collapse closer together (e.g., compress as shown in FIGS. 1-3). In this manner, the disclosed attachment assembly 100 (FIGS. 7A, 7B and 9-15), 200 (FIGS. 8A and 8B) functions to effectively accommodate differing (e.g., without limitation, non-linear) dimensional changes between the two components (e.g., without limitation, plug 102 and shaft 104, shown in FIGS. 7A, 7B, 9 and 13-15) being mated, even if the components have different coefficients of thermal expansion, yet the locking elements (e.g., without limitation, keys 8, 10, 12, 14) remain engaged with both components (e.g., without limitation, plug 102 and shaft 104, shown in FIGS. 7A, 7B, 9 and 13-15), locking the components together in linear or axial directions.

FIGS. 7A and 7B show section views of an assembled attachment assembly 2 in accordance with a non-limiting example embodiment of the disclosed concept. The attachment assembly 100 in the example shown includes a shaft or stem 104 employing a locking device key assembly 2 as discussed hereinabove, being employed with a generally straight plug 102. In FIG. 7A, the locking device key assembly 2 is shown in the expanded or locked position, whereas FIG. 7B shows the locking device key assembly 2 in the compressed or unlocked position.

FIGS. 8A and 8B show section views of an assembled attachment assembly 200 in accordance a second non-limiting example embodiment of the disclosed concept. The attachment assembly 200 in the example shown includes a shaft 104 employing a locking device key assembly 2 that is substantially the same as the embodiment of FIGS. 7A and 7B, however, it is instead employed with a generally tapered member 202, as shown. In FIG. 8A, the locking device key assembly 2 is shown in the expanded or locked position, whereas FIG. 8B shows the locking device key assembly 2 in the compressed or unlocked position.

Accordingly, it will be appreciated that FIGS. 7A and 7B, and FIGS. 8A and 8B, illustrate two non-limiting examples of the disclosed attachment assembly 100, 200 being employed to effectively attach, and lock, two components (e.g., without limitation, plug 102 and stem 104 of FIGS. 7A and 7B, and tapered member 202 and stem 104 of FIGS. 8A and 8B, respectively) together. It will be appreciated that, the first component (e.g., without limitation, plug 102, plug 202) may optionally include a number of features such as, for example and without limitation, chamfers, steps, or other transitions or features that do not substantially alter the overall shape or appearance of the component and still be "generally straight" or "generally tapered" in accordance with the invention.

Continuing to refer to FIGS. 7A, 7B, 8A and 8B, as well as FIG. 10, the operation of the attachment assembly 100 and locking device assembly 2 therefor will now be described in greater detail. That is, as used herein, the term "removable" means that the components (e.g., without limitation, 102, 104; 202) of the attachment assembly 100 cannot separate or unlock unintentionally. Rather, action is required to purposely or intentionally separate the components. One possibility for achieving this could be by destroying one of the components (e.g., without limitation, plug 102, 202), in order to remove it from the other component (e.g., without limitation, shaft 104), and replace it with another component (e.g., without limitation, new plug 102, 202). Alternatively, in the non-limiting example shown and described herein, the manner to achieve such intentional unlocking and separate is by manually or mechanically compressing or otherwise intentionally decoupling the locking device key assembly 2.

By way of one non-limiting example application for the disclosed concept, it will be appreciated that the first component (e.g., without limitation, 202) of the attachment assembly 100 could be, for example and without limitation, a carbide tip 202 (FIGS. 8A and 8B) coupled to the second component (e.g., without limitation, shaft 104) by the locking device assembly 2, wherein the carbide tip 202 is removable, for example, in order to be replaced with a new or different carbide tip (not shown), wherein such removal may be effectuated by intentionally actuating (e.g., without limitation, compressing; unlocking) the locking device assembly 2 and removing the original carbide tip 202 from the shaft 104. Of course, it will be appreciated that the foregoing is merely one non-limiting example application for the disclosed concept, and that the attachment assembly 100 and locking device assembly 2 therefor could alternatively be used in any number of known or suitable other applications apart from, or in addition to, this non-limiting example.

In the non-limiting embodiment of FIGS. 7A and 7B, the attachment assembly 100 further includes an actuating mechanism, which in the example shown is a plurality of set screws 300, 304 (two are shown in FIG. 7B) disposed within corresponding threaded apertures 150, 154, respectively, of the plug 102. It will be appreciated that four set screws 300, 304 (only two are shown) disposed in four corresponding threaded apertures 150, 152, 154, 156 (all shown in in FIG. 10) are contemplated, wherein the apertures 150, 152, 154, 156 and corresponding set screws (e.g., 300, 304) are symmetrically disposed about the plug 102. Further, the apertures 150, 152, 154, 156 and corresponding set screws (e.g., 300, 304) are structured to be aligned with corresponding keys (e.g., 8, 12) of the locking device key assembly 2. Accordingly, it will be appreciated that in operation the set screws (e.g., 300, 304) can be actuated (e.g., without limitation, turned and tightened radially inwardly against corresponding keys (e.g., 8, 12) to compress the keys 8, 12 and biasing elements 4, 6, thereby moving the locking device key assembly 2 to the compressed or unlocked position of FIG. 7B. In this manner, intentional removal of the first component (e.g., plug 102) from the second component (e.g., 104) can be effectuated. Likewise, it will be readily understood that the set screws (e.g., 300, 304) can be actuated in reverse (e.g., without limitation, turned the opposite direction to loosen and move radially outwardly) to move or release the locking device key assembly 2 to the expanded or locked position, shown for example in FIG. 7A.

It will be appreciated that an added benefit of the foregoing assembly is that the set screws (e.g., 300, 304) also function to close or seal the thru holes (e.g., threaded apertures 150, 152, 154, 156), thereby preventing the ability for fluid or contaminants to unintentionally enter and contaminate the assembly.

It will further be appreciated, that the foregoing represents merely one non-limiting example embodiment of an actuating mechanism (e.g., without limitation, set screws 300, 304) for actuating the locking device key assembly 2 to intentionally effectuate removal. Any known or suitable alternative number, type and/or configuration of actuating mechanism(s) and/or elements therefor (e.g., without limitation, apertures; set screws; a separate tool (not shown)) could be employed, without departing from the scope of the disclosed concept.

Figure 9:
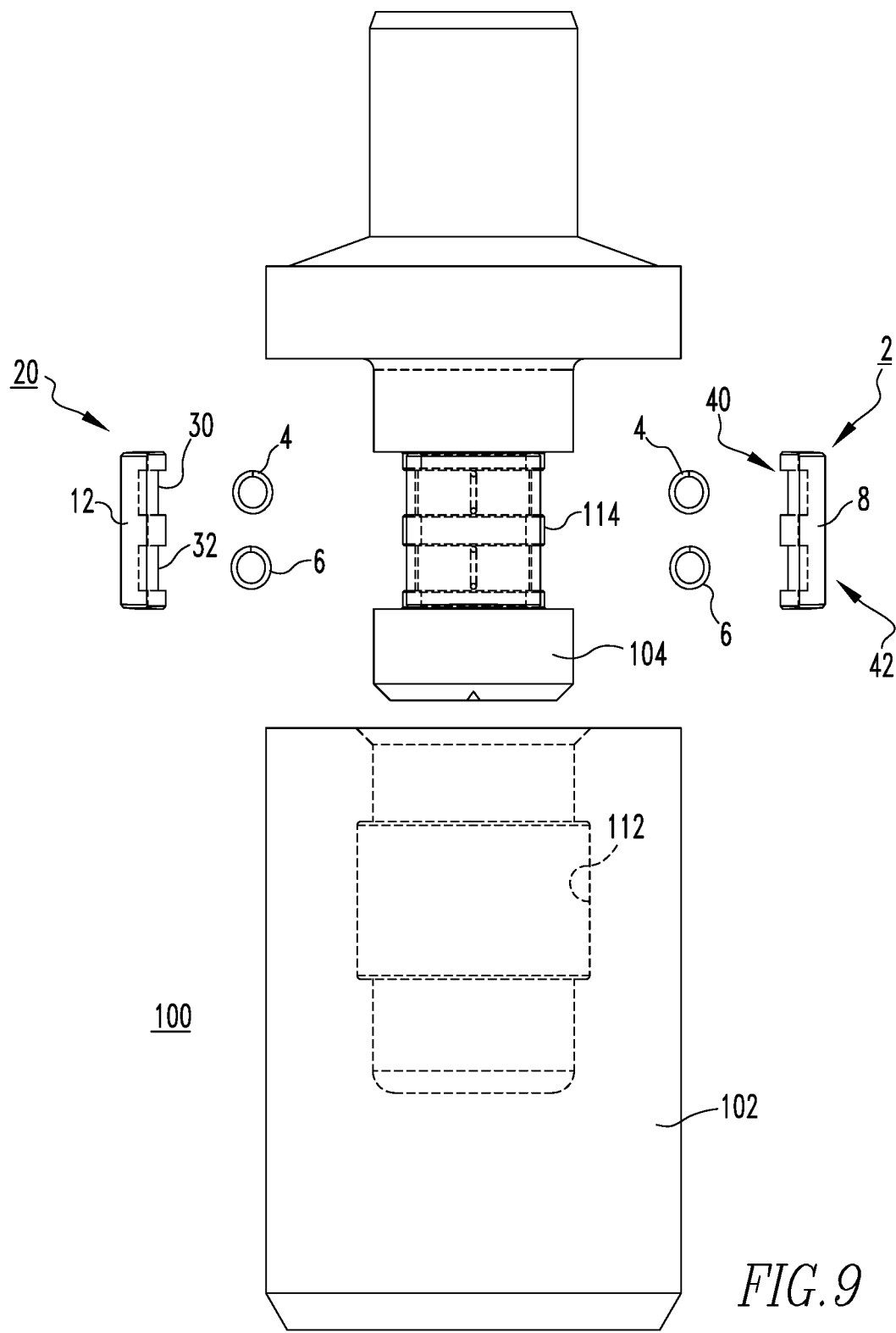
FIG. 9 is an exploded side elevation view of the attachment assembly of FIG. 7.

FIG. 9 is an exploded view provided for purposes of better showing the aforementioned individual elements of the attachment assembly 100 and locking device key assembly 2 therefore, in greater detail. It will be appreciated that the biasing elements 4, 6 (e.g., without limitation, canted coil springs) are only partially shown in section view in order to more clearly see features of the stem 104. As shown in FIG. 9, each arcuate segment or key (keys 8 and 12 are shown in FIG. 9) preferably includes a number of recesses 30, 32 such that when all of the keys 8, 10, 12, 14 are combined to form the aforementioned expandable ring 20, the individual recesses 30, 32 of the keys 8, 10, 12, 14 form annular grooves 30, 32. In the example shown, the expandable ring 20 includes a first annular groove 30 for receiving a first canted coil spring 4, and a second annular groove 32 for receiving a second canted coil spring 6.

Continuing to refer to FIG. 9, it will be appreciated that the shaft 104 extends through the expandable ring 20 such that the locking device key assembly 2 is disposed on the shaft 104 (see also, FIGS. 7A, 7B, 8A, 8B and 11-15). In more detail, locking device key assembly 2 includes an interior 40 and an exterior 42, the plug 102 preferably includes a first annular recess 112 (shown in hidden line drawing in FIG. 9), and the shaft 104 preferably includes a second annular recess 114. The first annular recess 112 of the plug 102 is preferably sized and shaped to correspond to the exterior 42 of the locking device key assembly 2 (best shown in 7A, 7B and 13-15). The second annular recess 114 of the shaft 104 is preferably sized and shaped to correspond to the interior 40 of the locking device key assembly 2 and, in particular, to the canted coil springs 4, 6 thereof, as shown (see also, FIGS. 7A, 7B, 8A, 8B and 11-15). That is, the canted coil springs 4, 6 are disposed on the interior 40 of the locking device key assembly 2 between the keys 8, 10, 12, 14 and the shaft 104. The keys 8, 10, 12, 14 are retained axially within the annular recess 114 by the walls of the recess. Furthermore, it will be appreciated that in operation, the keys 8, 10, 12, 14 are manually retained about the canted coil springs 4, 6, within the annular recess 114, immediately prior to assembly, and are structured to expand radially outwardly into the first annular recess 112 of the plug 102, when the locking device key assembly 2 is disposed in the expanded or locked position, shown in FIGS. 7A and 15.

It will be appreciated that the example embodiments shown and described herein are for purposes of illustration of one non-limiting example of the disclosed concept. That is, alternative embodiments not specifically shown and described herein are not excluded, but rather are specifically contemplated as falling within the scope of the invention. For example and without limitation, in another non-limiting embodiment of the disclosed concept, which is not shown for economy of disclosure, the first and/or second components (e.g., without limitation, plug 102; shaft 104) could include multi-sided compatible interface elements and incorporate at least one locking element and at least one biasing element. For example and without limitation, a circular spring could conform to a hexagonal or octagonal shaft (i.e., six or eight sides). In another alternative embodiment, also not shown, the shaft could be square, for example, and a suitable number, type and/or configuration of straight springs or other suitable biasing elements could be disposed in thru holes in the shaft to bias the locking element(s) as desired.

Figure 10:
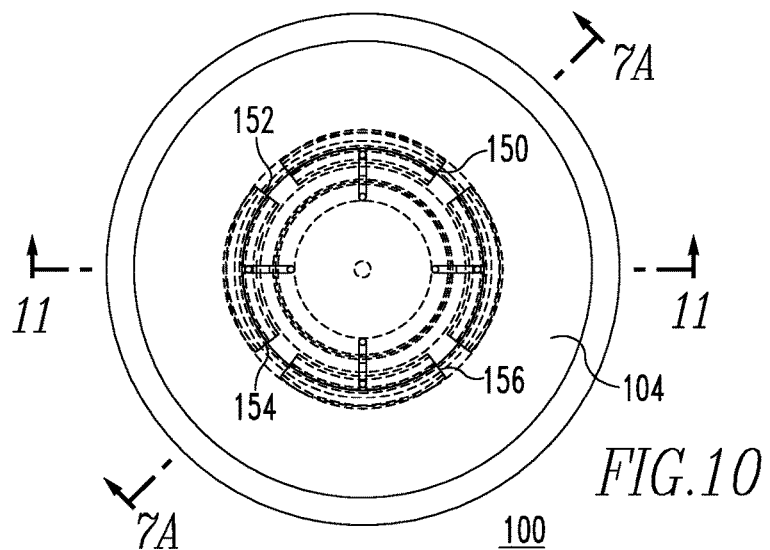
FIG. 10 is a top plan view of a portion of the attachment assembly of FIG. 9.
Figures 11, 12:
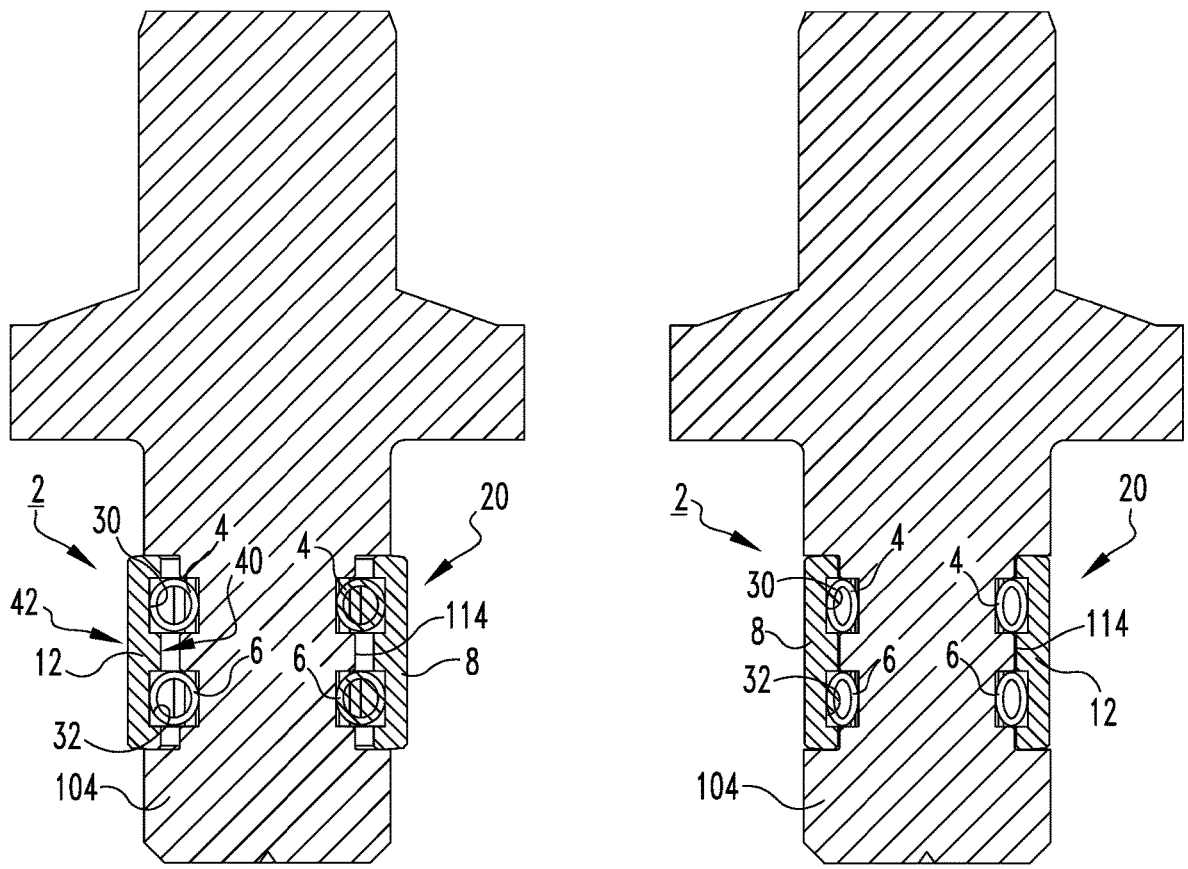
FIG. 11 is a section view taken along line A-A of FIG. 10, showing the keys in the expanded position.
FIG. 12 is another section view of the portion of the attachment assembly, showing the keys in the compressed position.
Figure 13:
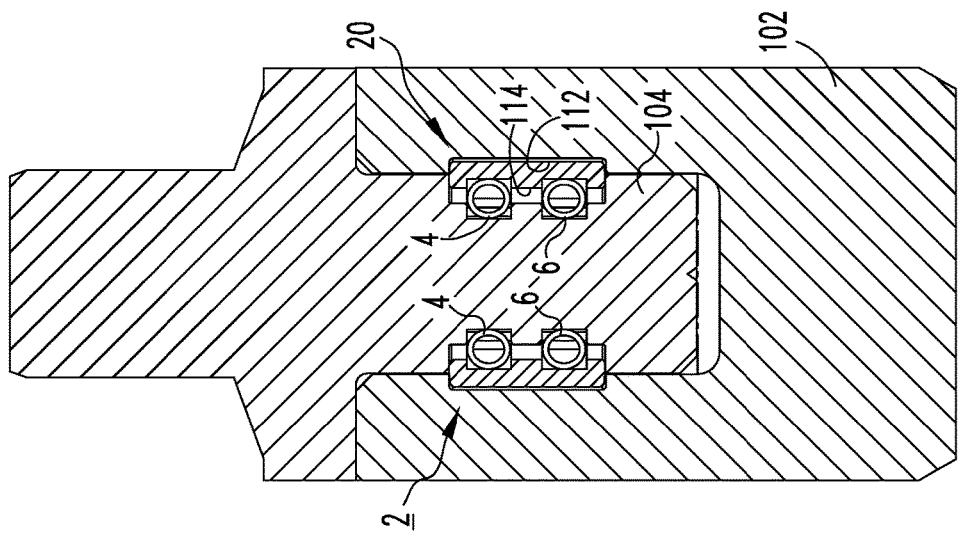
FIG. 13 is a section view of the attachment assembly being assembled.
Figure 14:
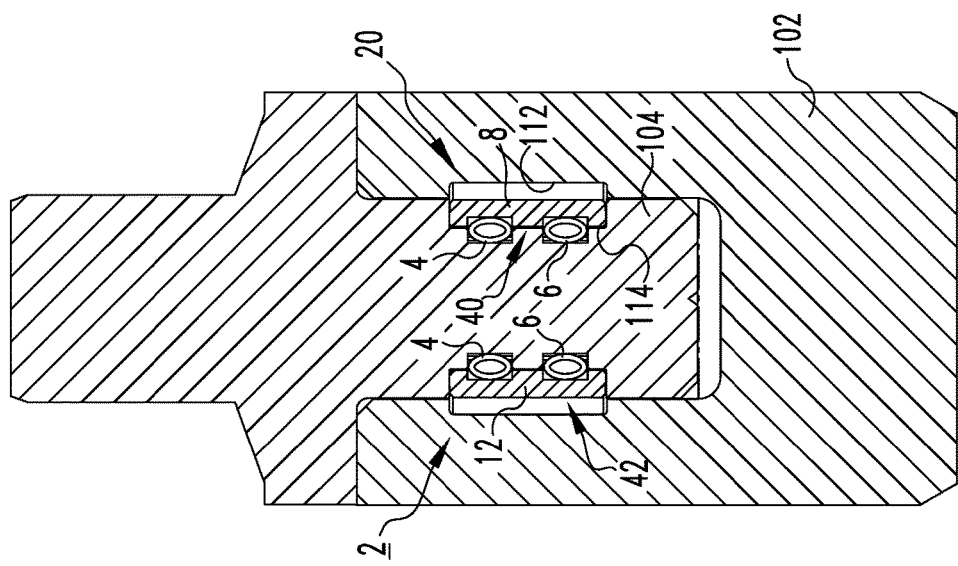
FIG. 14 is a section view of the attachment assembly, shown assembled but with the keys in the compressed position.
Figure 15:
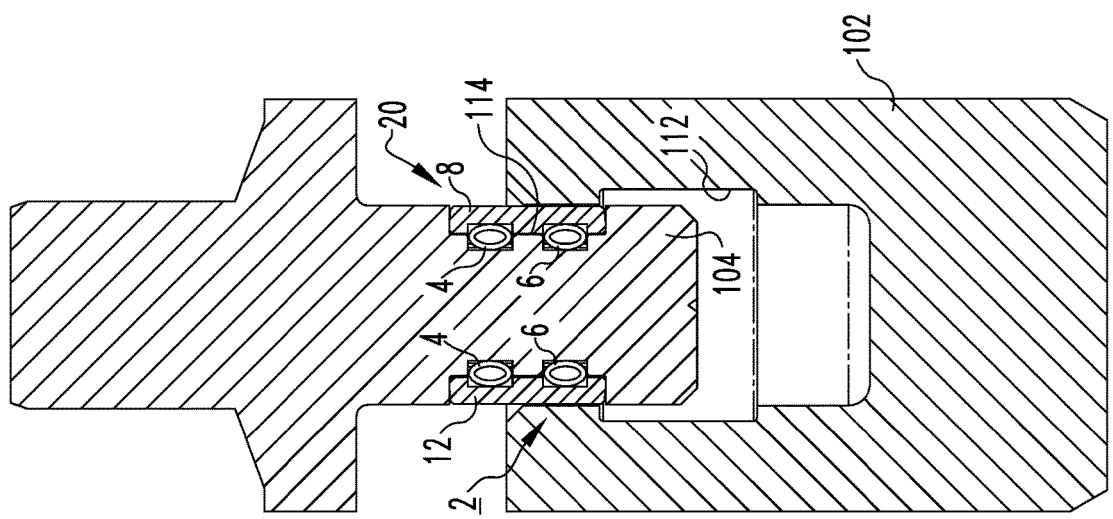
FIG. 15 is a section view of the attachment assembly, shown fully assembled and with the keys in the expanded position.

FIGS. 10 and 11 show the stem or shaft 104 and locking device key assembly 2 from a top plan view and section view, respectively. In FIG. 11, the shaft 104 is shown with the keys 8, 10, 12, 14 (only keys 8 and 12 are shown in the section view of FIG. 11) of the locking device key assembly 2 in the expanded position. FIG. 12, on the other hand, provides a section view of the shaft 104 and locking device key assembly 2 with the keys 8, 10, 12, 14 (only keys 8 and 12 are shown in the section view of FIG. 12) of the locking device key assembly 2 disposed in the retracted or compressed position. It will be appreciated that the retracted or compressed position of FIG. 12 corresponds to an "unlocked" position in which the shaft 104 can be readily inserted into, and potentially but not necessarily removed from, another component such as, for example and without limitation, a plug 102 (see also, for example and without limitation, tapered plug 202 of FIGS. 8A and 8B), as shown in FIG. 13 (shown unlocked and partially inserted) and FIG. 14 (shown unlocked and fully inserted). By contrast, the extended position, shown in FIGS. 11 and 15, corresponds to a "locked" position. That is, the keys 8, 10, 12, 14 (only keys 8 and 12 are shown in the section views of FIGS. 11 and 15) are extended radially outwardly into corresponding recesses 112 of the plug 102 or other suitable attachment component (not shown). Thus, the two components (e.g., without limitation, stem or shaft 104 and plug 102 (see also plug 202 of FIGS. 8A and 8B), or any other known or suitable components) are effectively secured together.

At the same time, the compressibility of the canted coil springs (e.g., without limitation, 4, 6) or other suitable biasing element(s) (not shown) function to accommodate expansion and contraction between the two components (e.g., without limitation, 102, 104) which could result, for example, from the components being made from two different materials having two different coefficients of thermal expansion.

Accordingly, it will be appreciated that, among other advantages, the disclosed attachment assembly and method employs elements that can extend apart (e.g., expand) or collapse closer together (e.g., compress) to accommodate differing (e.g., without limitation, non-linear) dimensional changes between the two components being mated, even if the components have different coefficients of thermal expansion, yet the locking elements remain engaged with both components, locking the components together in linear or axial directions.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of disclosed concept which is to be given the full breadth of the claims appended and any and all equivalents thereof.

What is claimed is:

1. An attachment assembly comprising:
   a first component;
   a second component; and
   a locking device assembly structured to move between an unlocked position corresponding to the second component being attachable to, and removable from, the first component and a locked position corresponding to the second component being securely coupled to the first component,
   wherein the locking device assembly includes at least one biasing element and a number of locking elements; and wherein the at least one biasing element is structured to move between an expanded position and a compressed position, and then return to an expanded position, thereby moving the number of locking elements, wherein the at least one biasing element is a circular biasing element; wherein the number of locking elements is a plurality of arcuate segments disposed about a perimeter of the circular biasing element to form an expandable ring; wherein in the expanded position the circular biasing element is structured to bias the plurality of arcuate segments radially outward; and wherein in the compressed position the circular biasing element is structured to compress thereby moving the plurality of arcuate segments radially inward,
   wherein the first component is a plug; wherein the second component is a shaft; wherein the shaft extends through the expandable ring such that the locking device assembly is disposed on the shaft; wherein, when the locking device assembly is in the compressed or unlocked position, the shaft can be inserted into and removed from the plug; and wherein, when the locking device assembly is in the expanded or locked position, the shaft is securely coupled to the plug, and
   wherein the plug includes a first annular recess; wherein the shaft includes a second annular recess; wherein the locking device assembly is a locking device key assembly having an interior and an exterior; wherein the first annular recess corresponds to the exterior of the locking device key assembly; and wherein the second annular recess corresponds to the interior of the locking device assembly.

2. The attachment assembly of claim 1 wherein the plurality of arcuate segments of the expandable ring comprise keys of the locking device key assembly.

3. The attachment assembly of claim 2 wherein the keys of the locking device key assembly are structured to expand radially outwardly into the first annular recess of the plug when the locking device key assembly is in the expanded or locked position.

4. The attachment assembly of claim 2 wherein the at least one circular biasing element is disposed on the interior of the locking device key assembly between the keys and the shaft to movably secure the locking device key assembly within the second annular recess of the shaft.

5. The attachment assembly of claim 4 wherein the at least one circular biasing elements is a first canted coil spring and a second canted coil spring; and wherein the plurality of keys is four keys radially disposed about the first canted coil spring and the second canted coil spring.

6. The attachment assembly of claim 4 wherein the plug further includes at least one actuating mechanism adapted to unlock the locking device key assembly.

7. The attachment assembly of claim 6 wherein the plug further includes a plurality of radially disposed threaded apertures; wherein each of the threaded apertures extends through the plug and is aligned with a corresponding one of the keys of the locking device key assembly; and wherein the at least one actuating mechanism is a plurality of set screws each being movably disposed in a corresponding one of the threaded apertures.

8. The attachment assembly of claim 1 wherein the plug is made from a first material; and wherein the shaft is made from a second material different from the first material of the plug.

9. The attachment assembly of claim 8 wherein the first material has a first coefficient of thermal expansion; wherein the second material has a second coefficient of thermal expansion; and wherein the first coefficient of thermal expansion is different than the second coefficient of thermal expansion.

10. The attachment assembly of claim 1 wherein the at least one biasing element is at least one canted coil spring.

11. The attachment assembly of claim 1 wherein each of the arcuate segments includes a number of recesses; and wherein each circular biasing element is disposed in a corresponding one of the recesses.

12. The attachment assembly of claim 11 wherein each of the arcuate segments includes a first recess and a second recess; wherein the first recess of all of the arcuate segments of the expandable ring combine to form a first radial groove; wherein the second recess of all of the arcuate segments of the expandable ring combine to form a second radial groove; wherein the at least one biasing element is a first canted coil spring and a second canted coil spring; wherein the first canted coil spring is disposed in the first radial groove; and wherein the second canted coil spring is disposed in the second radial groove.

13. The attachment assembly of claim 12 wherein the plurality of arcuate segments that comprises the expandable ring consists of four equal arcuate segments.

\* \* \* \* \*